(12) United States Patent
Wang et al.

(10) Patent No.: US 6,896,988 B2
(45) Date of Patent: May 24, 2005

(54) ENHANCED HIGH EFFICIENCY FUEL CELL/TURBINE POWER PLANT

(75) Inventors: Zhao-Hui Wang, Bethel, CT (US); Hossein Ghezel-Ayagh, New Milford, CT (US)

(73) Assignee: FuelCell Energy, Inc., Danbury, CT (US)

( * ) Notice: Subject to any disclaimer, the term of this patent is extended or adjusted under 35 U.S.C. 154(b) by 83 days.

(21) Appl. No.: 10/660,320

(22) Filed: Sep. 11, 2003

(65) Prior Publication Data

US 2005/0058863 A1 Mar. 17, 2005

(51) Int. Cl.⁷ .............................................. H01M 8/04
(52) U.S. Cl. .............................. 429/26; 429/19; 429/22
(58) Field of Search ............................. 429/13, 17, 19, 429/20, 22, 26

(56) References Cited

U.S. PATENT DOCUMENTS 6,365,290 B1 * 4/2002 Ghezel-Ayagh et al. ...... 429/20

OTHER PUBLICATIONS

G. Steinfeld et al., "High Efficiency Carbonate Fuel Cell/Turbine Hybrid Power Cycle," Proceedings of the 31st Intersociety Energy Conversion Engineering Conference, vol. 2 (1996), pp. 1123–1127.*

* cited by examiner

Primary Examiner—Jonathan Crepeau
(74) Attorney, Agent, or Firm—Cowan, Liebowitz & Latman, P.C.

(57) ABSTRACT

A hybrid fuel cell system having a fuel cell and a heat engine having an expansion cycle and a compressor cycle and which is further adapted to include a bypass assembly for segmenting expanded oxidant supply gas from the expansion cycle of the heat engine into a first expanded oxidant supply gas portion and a second expanded gas portion and in which the first expanded oxidant supply gas portion is used for the fuel cell and the second expanded gas portion bypassed around the fuel cell.

25 Claims, 2 Drawing Sheets

ENHANCED HIGH EFFICIENCY FUEL CELL/TURBINE POWER PLANT

BACKGROUND OF THE INVENTION

This invention relates to fuel cell systems and, in particular, to integrated fuel cell and gas turbine systems having enhanced efficiency.

A fuel cell is a device which directly converts chemical energy stored in hydrocarbon fuel into electrical energy by means of an electrochemical reaction. Generally, a fuel cell comprises an anode and a cathode separated by an electrolyte, which serves to conduct electrically charged ions.

A fuel cell may be combined with a heat engine such as a turbine generator to produce a high efficiency system, commonly called a hybrid system. In a conventional hybrid system, the fuel cell is typically situated in the position normally occupied by the combustor of the turbine generator so that air compressed by the turbine generator compressor section is heated and then sent to the fuel cell cathode section. In this arrangement, the fuel cell is operated at a high pressure, which substantially increases the cost of the power plant hardware and inhibits the use of internal reforming in the fuel cell. This further increases the plant cost and reduces efficiency, and subjects the fuel cell to potentially damaging pressure differentials in the event of plant upset. Furthermore, the fuel cell pressure is coupled with gas turbine pressure, limiting the application to system designs where the gas turbine pressure is nearly matched with the fuel cell pressure.

To overcome these disadvantages, another type of arrangement of a hybrid system has been developed, where a turbine generator is bottomed with a fuel cell so that the heated air discharged from the gas turbine is delivered to the cathode section of the fuel cell. U.S. Pat. No. 6,365,290, assigned to the same assignee hereof, discloses such a hybrid fuel cell/gas turbine system, in which waste heat from the fuel cell is used by a heat recovery unit to operate the heat engine cycle, and the system is arranged such that the compressed oxidant gas, heated in the heat recovery unit and by a heat exchanger, is expanded in the expansion cycle of the heat engine. It is then passed through an oxidizer which also receives the anode exhaust, passed through the heat exchanger and the resultant gas delivered to the cathode section of the fuel cell.

The aforesaid system of the '290 patent permits the fuel cell to be a high temperature fuel cell, while achieving a relatively high efficiency. However, the system also requires that the fuel cell size and the gas turbine size be matched in order to produce optimal efficiencies. This limits the usefulness of the system.

It is therefore an object of the present invention to provide an improved hybrid fuel cell/turbine system having greater flexibility in the balance of power between the fuel cell and the turbine.

It is a further object of the present invention to provide a hybrid fuel cell/turbine system which has enhanced efficiency and increased power output.

SUMMARY OF THE INVENTION

In accordance with the principles of the present invention, the above and other objectives are realized in a hybrid fuel cell system comprising a fuel cell having an anode section and a cathode section, a heat engine having a compressor cycle compressing oxidant supply gas and an expansion cycle, and a heat recovery unit responsive to exhaust gas from the cathode section of the fuel cell. The heat recovery unit supplies heat to the compressed oxidant supply gas which is then expanded in the expansion cycle of the heat engine to provide an expanded oxidant supply gas and produce mechanical energy for conversion to electrical energy in a generator. A bypass assembly segments the expanded oxidant supply gas into a first expanded oxidant supply gas portion and a second expanded oxidant supply gas portion, and the first expanded oxidant supply gas portion is used to generate the oxidant supply gas input to the cathode section of the fuel cell and the second expanded oxidant supply gas portion is excluded from the fuel cell.

In the embodiments of the invention to be disclosed hereinafter, the bypass assembly includes a controllable bypass valve having an input port receiving the expanded oxidant supply gas from the expansion cycle of the heat engine and first and second output sections for outputting the first and second expanded oxidant supply gas portions. The first section communicates with a line to the fuel cell and the second section communicates with a bypass line communicating with a line responsive to the cathode exhaust gas, the bypass line forming a part of the bypass assembly. The bypass assembly also includes a control scheme such as a gas flow detector and control for detecting the second expanded oxidant gas portion and for adjusting the bypass valve for controllably apportioning the first and second expanded oxidant gas portions. In this way, the compressor cycle of the heat engine and the fuel cell can be operated at their highest efficiencies.

Embodiments of the invention using a carbonate fuel and a solid oxide fuel cell are disclosed.

BRIEF DESCRIPTION OF THE DRAWINGS

The above and other features and aspects of the present invention will become more apparent upon reading the following detailed description in conjunction with the accompanying drawing, in which.

DETAILED DESCRIPTION

Figure 1:
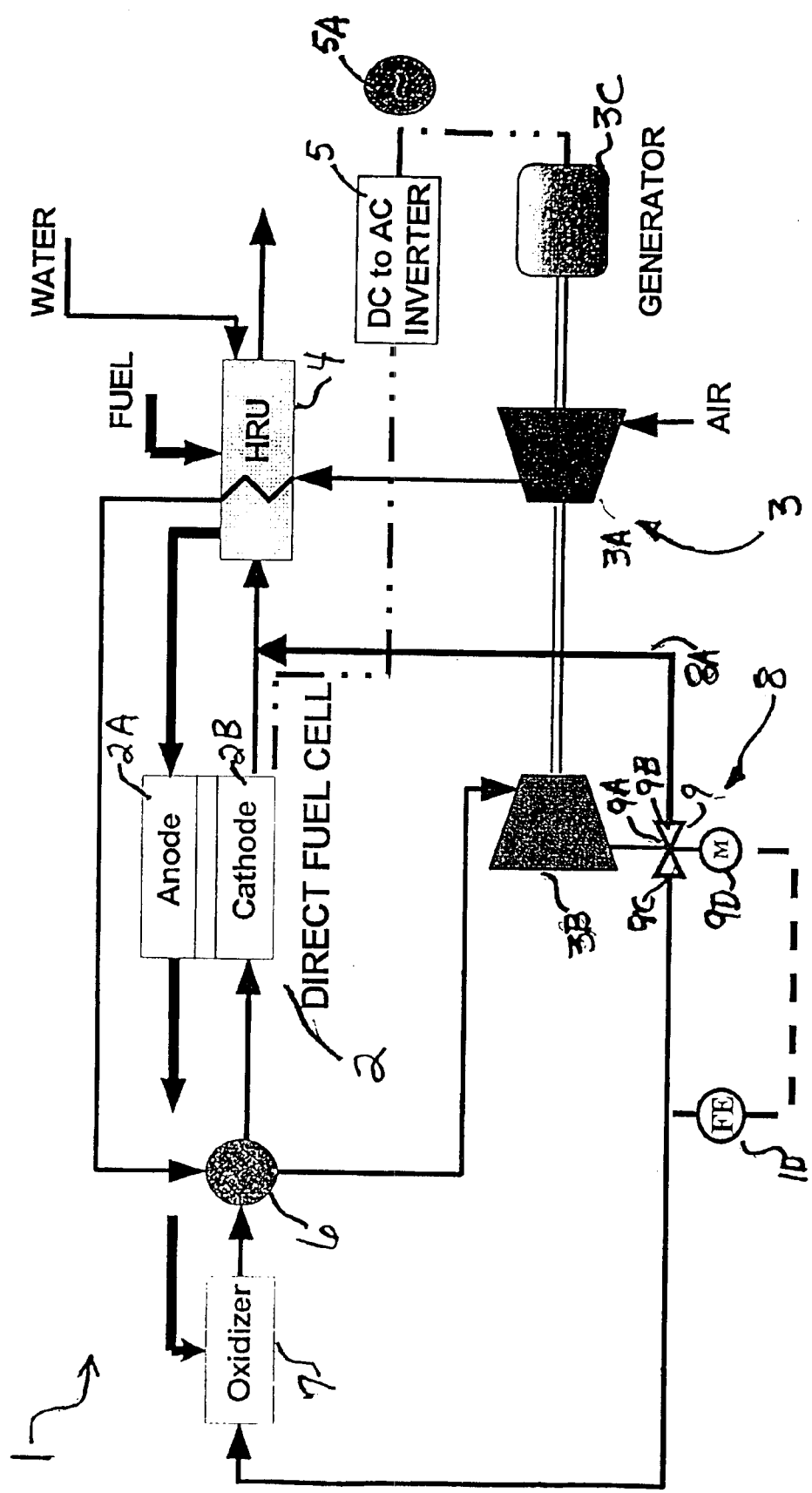
FIG. 1 shows an improved hybrid fuel cell/turbine system using a carbonate fuel cell in accordance with the principles of the present invention.

FIG. 1 shows a first embodiment of a hybrid fuel cell system 1 in accordance with the principles of the present invention. The system 1 includes a high temperature fuel cell 2 having an anode section 2A and a cathode section 2B. As shown, the high temperature fuel cell 2 is an internally reforming or a direct carbonate fuel cell. However, an externally reforming carbonate fuel cell can also be employed. The DC output of the fuel cell 2 is fed to a DC to AC converter 5 to provide an AC output 5A.

The hybrid system 1 includes a heat engine 3, shown illustratively as a turbine generator, having a gas compressor section 3A for carrying out a gas compression cycle and a gas decompression or expansion section 3B for carrying out a gas expansion cycle. The heat engine 3 also includes a generator 3C coupled to the heat engine 3 for converting mechanical energy produced in the expansion cycle into electrical energy. Heat engines such as a gas turbine or a Sterling cycle engine may be employed as a typical heat engine.

The hybrid system 1 also comprises a heat recovery unit ("HRU") 4 which receives fuel at near ambient pressure and water from respective fuel and water supplies (not shown). The heat recovery unit 4 also receives heated exhaust gas at approximately 1150 to 1200 degrees Fahrenheit from the cathode section 2B of the fuel cell 2. This heated exhaust gas includes unspent oxidant gas as well as products of combustion, i.e. carbon dioxide and water.

The heat recovery unit 4 is used to heat the water to the point of producing steam and to heat the fuel to a temperature suitable for entry into the fuel cell anode. The heat recovery unit 4 also acts as a heat exchanger for the oxidant gas compressed by the compressor cycle 3A of the heat engine 3, whereby the compressed oxidant gas is heated to a temperature between 900 and 1000 degrees Fahrenheit. The heated compressed oxidant gas is then conveyed to a further heat exchanger 6 for further heating to a high temperature exceeding 1400 degrees Fahrenheit. After being heated in the heat exchanger 6, compressed oxidant gas is passed through the expansion section 3B of the heat engine 3 where it expanded to a low pressure of approximately 15.5 psia, producing mechanical energy for conversion to electrical energy by the generator 3C.

A portion of the expanded gas (output section 9C of valve 9) is fed to an oxidizer 7 which also receives the exhaust gas from the anode section 2A of the fuel cell containing unspent oxidant and products of combustion, i.e. carbon dioxide and water. The output stream from the oxidizer is cooled in the heat exchanger 6 to a temperature suitable for entry into the cathode section 2B of the fuel cell.

In accordance with the invention 1 and as shown in FIG. 1, the hybrid system 1 also comprises a bypass assembly 8 for bypassing a portion of the expanded oxidant gas from the turbine expansion section outlet around the fuel cell 2 to the fuel cell cathode exhaust stream. As an example, the bypass assembly 8 includes a bypass line 8A, a controllable gas flow control valve 9, such as, for example, a three-way valve or a diverter valve, and a gas flow detector and controller 10.

The gas flow control valve has an input port 9A coupled to the output of the heat engine expansion (turbine) section 3B and first and second output sections 9B and 9C. The first output section 9B couples with the bypass line 8A which, in turn, is connected to the line carrying the exhaust gas from the cathode section 2B of the fuel cell 2. The second output section 9C connects to the line feeding the oxidizer 7. By adjusting the valve 9 via the valve actuator assembly 9D (shown as a motor driven actuator) based on the gas flow in the latter line detected by the flow detector 11, the expanded oxidant gas from the expansion cycle 3B of the heat engine 3 can be controllably apportioned to the output sections 9B and 9C. In this way, the amounts of expanded oxidant gas fed to the fuel cell 2 and bypassed around the fuel cell can be adjusted to optimize the efficiency of the system 1.

More particularly, the gas flow control valve 9 can be adjusted so that the amount of the expanded oxidant gas coupled to the output section 9B is sufficient and optimum for the operating condition of the fuel cell 2. In addition, the apportioning of the gas between the output sections 9B and 9C can be adjusted in order to achieve optimal fuel cell temperature distribution and oxygen concentration in the fuel cell 2. Accordingly, the gas flow control valve 9 and the gas flow detector 11 function to control and optimize the balance of power between the fuel cell 2 and the heat engine 3 during the operation of the hybrid system 1.

As can also be appreciated, use of the bypass assembly 8 allows the heat engine 3 to operate at a higher gas flow than what is required by the fuel cell operation, which, in turn, results in greater recuperation of heat. Therefore, the heat engine 3 is capable of generating more power than it would in the absence of the assembly 8. Such additional power results in higher efficiency and reduced costs of the system 1. Moreover, the bypass assembly 8 eliminates the matching restrictions between the size of the fuel cell 2 and the size of the heat engine 3. Accordingly, the hybrid fuel cell system can employ commercial heat engines capable of operating at higher gas flows than the maximum gas flow allowed by a particular fuel cell.

A system analysis was carried out on the hybrid fuel cell/gas turbine system 1 in accordance with the present invention using a 40 MW power plant, an internally reforming molten carbonate fuel cell and a gas turbine. This system analysis was then compared with the system analysis for a hybrid fuel cell/gas turbine system without a bypass line, as disclosed in the '290 patent. The following projected operating characteristics were determined for these systems:

|  | Improved Hybrid System of the Invention | Hybrid System of the '290 patent |
| --- | --- | --- |
| Oxidizer Gas Flow |  |  |
| Gas Flow to Turbine (lb/s) | 96 | 80 |
| Gas Flow to Bypass (lb/s) | 16 | — |
| Fuel Cell Power |  |  |
| DC Power (MW) | 33.548 | 33.548 |
| Power Loss (MW) | 1.006 | 1.006 |
| AC Output (MW) | 32.542 | 32.542 |
| Turbine Power |  |  |
| Turbine Power (MW) | 20.968 | 17.472 |
| Compressor Power Loss (MW) | 10.728 | 8.936 |
| Generator Power Loss (MW) | 0.512 | 0.427 |
| Turbine Power Output (MW) | 9.728 | 8.109 |
| Hybrid System |  |  |
| Total System Output (MW) | 41.966 | 40.347 |
| Overall LVH Efficiency: | 75.1% | 72.2% |

As shown above, the operation of the hybrid fuel cell/gas turbine system 1 according to the present invention resulted in a 2.9 percent efficiency increase and a 4% increase in power output over the hybrid fuel cell/gas turbine system of the '290 patent. In addition, the hybrid system 1 of the invention was capable of employing a more powerful gas turbine, thus producing a higher gas turbine power output than in the hybrid system of the '290 patent.

Figure 2:
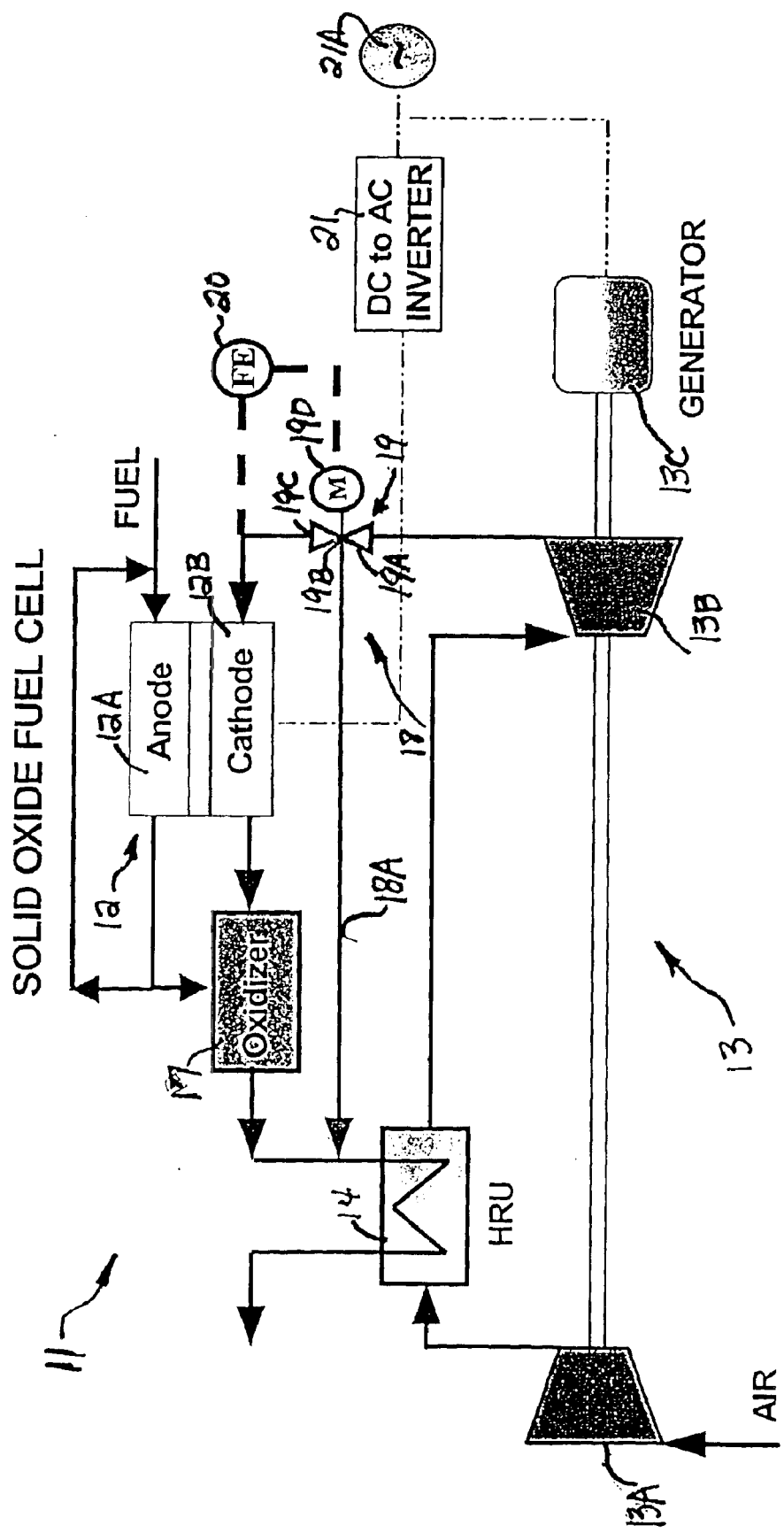
FIG. 2 shows an improved hybrid fuel cell/turbine system using a solid oxide fuel cell in accordance with the principles of the present invention.

FIG. 2 shows a second embodiment of a hybrid fuel cell system 11 in accordance with the principles of the present invention. In this embodiment, the high temperature fuel cell employed is a is a solid oxide fuel cell 12 having an anode section 12A and a cathode section 12B. As shown in FIG. 2, the solid oxide fuel cell 12 is an internally reforming solid oxide fuel cell. However, an externally reforming solid oxide fuel cell can also be employed. The DC output of the fuel cell 12 is fed to a DC to AC converter 21 to provide an AC output 21A.

The solid oxide hybrid system 11 comprises a heat engine 13, shown illustratively as a turbine generator, having a gas compressor section 13A for carrying out a gas compression cycle and a gas expansion section 13B for carrying out a gas expansion cycle. The heat engine 13 also includes a generator 13C coupled to the gas expansion section 13B for converting mechanical energy produced in the gas expansion cycle into electrical energy.

The solid oxide hybrid system 11 also comprises a heat recovery unit ("HRU") 14 and an oxidizer 17. The oxidizer 17 receives heated exhaust gas from the cathode section 12B of the fuel cell 12 containing unspent oxidant gas, and a portion of the exhaust gas from the anode section 12A of the fuel cell 12 containing unspent fuel and reaction byproducts, i.e., carbon dioxide and water. The oxidizer output stream is fed to the heat recovery unit 14.

The heat recovery unit 14 acts as a heat exchanger for the oxidant gas compressed by the compressor cycle 13A of the heat engine 13, whereby the compressed oxidant gas is heated to an elevated temperature in excess of 1400 degrees Fahrenheit by the oxidizer output. The heated compressed oxidant gas is then passed through the expansion section 13B of the heat engine 13 where it is expanded to a low pressure of approximately 15.5 psia, producing mechanical energy for conversion to electrical energy by the generator 13C. A portion of the expanded gas (output section 9C of the valve 9) is then fed to the cathode 12B of the solid oxide fuel cell 12.

In accordance with the second embodiment of the invention and as shown in FIG. 2, the hybrid solid oxide fuel cell system also comprises a bypass assembly 18 for bypassing a portion of the expanded oxidant gas from the turbine expansion section outlet around the fuel cell 12 and the oxidizer 17 to the oxidizer exhaust stream. As an example, the bypass assembly comprises a bypass line 18A, a controllable gas flow control valve 19, such as, for example, a three-way valve or a diverter valve, and a gas flow detector and controller 20.

The gas flow control valve 19 comprises an input port 19A, and output ports 19B and 19C and a valve actuator assembly motor 19D (shown as a motor driven actuator). The input port 19A is coupled to the output of the heat engine expansion section 13B. The first output section 19B is coupled with the bypass line 18A, which, in turn, is connected to the line carrying the oxidizer exhaust gas from the oxidizer 17 to the heat recovery unit 14. Alternately, the bypass line may be connected to the exhaust from the cathode 12B instead of the exhaust from the oxidizer 17. The second output section 19C connects to the line feeding the cathode section 12B of the solid oxide fuel cell 12. By adjusting the gas flow control valve 19 via the motor 19D based on the gas flow in the latter line detected by the gas flow detector 20, the expanded oxidant gas from the expansion cycle 13B of the heat engine 13 can be controllably apportioned to the output sections 19B and 19C. In this way, as in the embodiment in FIG. 1, the amounts of expanded oxidant gas fed to the solid oxide fuel cell 12 and bypassed around the fuel cell 12 can be adjusted to optimize the efficiency of the system 11 and to control and optimize the balance of power between the fuel cell 12 and the heat engine 13 during the system's operation.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the present invention. Thus, for example, the principles of the invention can be adapted to other high temperature fuel cells, such as, for example, proton conducting fuel cells. Additionally, the principles of the invention apply to both atmospheric as well as high-pressure fuel cells. In the latter cases, the expansion section of the heat engine expands the oxidant gas to the fuel cell operating pressure.

What is claimed is:

1. A hybrid fuel cell system comprising:
   a fuel cell having an anode section and a cathode section;
   a heat engine having a compressor cycle and an expansion cycle, said compressor cycle compressing oxidant supply gas;
   a heat recovery unit responsive to exhaust gas from the cathode section of said fuel cell, said heat recovery unit supplying heat to said compressed oxidant supply gas;
   the heated compressed oxidant supply gas being expanded in the expansion cycle of said heat engine to provide an expanded oxidant supply gas and produce mechanical energy for conversion to electrical energy in a generator;
   a bypass assembly for segmenting said expanded oxidant supply gas into a first expanded oxidant supply gas portion and a second expanded oxidant supply gas portion; and
   said first expanded oxidant supply gas portion being used to provide the oxidant supply gas input to the cathode section of said fuel cell and the second expanded oxidant supply gas portion being excluded from said fuel cell.

2. A hybrid fuel cell system in accordance with claim 1, wherein said bypass assembly includes a bypass line for coupling said second expanded oxidant supply gas portion to a line responsive to exhaust gas from said cathode section of said fuel cell.

3. A hybrid fuel cell system in accordance with claim 2, wherein said heat engine operates at a higher gas flow than the maximum gas flow required by said fuel cell cathode.

4. A hybrid fuel cell system in accordance with claim 3, wherein:
   said heat engine comprises a turbine generator having a compressor section for receiving said oxidant supply gas and performing said compressor cycle and an expansion section for receiving said further heated compressed oxidant supply gas and performing said expansion cycle.

5. A hybrid fuel cell system in accordance with claim 4, wherein said fuel cell is a high temperature fuel cell.

6. A hybrid fuel cell system in accordance with claim 5, wherein said fuel cell is an internally reforming fuel cell.

7. A hybrid fuel cell system in accordance with claim 6, wherein said fuel cell is a carbonate fuel cell.

8. A hybrid fuel cell in accordance with claim 7, wherein said fuel is supplied at near ambient pressure.

9. A hybrid fuel cell system in accordance with claim 3, wherein said fuel cell is one of an externally reforming fuel cell and an internally reforming fuel cell.

10. A hybrid fuel cell system in accordance with claim 9, wherein said fuel cell is one of a carbonate fuel cell and a solid oxide fuel cell.

11. A hybrid fuel cell system in accordance with claim 2, wherein said bypass assembly further includes: a flow control valve having an input port for receiving said expanded oxidant supply gas from said expansion cycle of said heat engine and first and second output sections for delivering said first and second expanded oxidant gas portions, respectively; and a flow detector and control for detecting said first expanded oxidant gas portion and controlling said flow control valve to adjust said first and second expanded oxidant gas portions.

12. A hybrid fuel cell system in accordance with claim 11, wherein said controlling of said flow control valve in such that the first expanded oxidant supply gas portion promotes optimal temperature distribution and oxygen concentration in said fuel cell.

13. A hybrid fuel cell system in accordance with claim 11, wherein said flow control valve is one of a three-way valve and a diverter valve.

14. A hybrid fuel cell system in accordance with claim 1, wherein:

said fuel cell is a carbonate fuel cell;

said heat recovery unit receives said exhaust gas from said cathode section of said fuel cell and the second expanded oxidant supply gas portion; and said fuel cell system further comprises: a heat exchanger for supplying additional heat to said heated compressed oxidant supply gas from said heat recovery unit prior to the heated compressed oxidant supply gas being expanded in the expansion cycle of said heat engine to provide said expanded oxidant supply gas; and an oxidizer for receiving said first expanded oxidant supply gas portion and exhaust gas from said anode section of said fuel cell to develop an oxidizer output, said oxidizer output passing through said heat exchanger and serving as said oxidant supply gas input to the cathode section of said fuel cell.

15. A hybrid fuel cell system in accordance with claim 14, wherein said bypass assembly includes a bypass line for coupling said second expanded oxidant supply gas portion to a line responsive to exhaust gas from said cathode section of said fuel cell.

16. A hybrid fuel cell system in accordance with claim 15, wherein said heat engine operates at a higher gas flow than the maximum gas flow required by said fuel cell cathode.

17. A hybrid fuel cell system in accordance with claim 16, wherein:

said heat engine comprises a turbine generator having a compressor section for receiving said oxidant supply gas and performing said compressor cycle and an expansion section for receiving said heated compressed oxidant supply gas after passage through said heat exchanger and performing said expansion cycle.

18. A hybrid fuel cell system in accordance with claim 15, wherein said bypass assembly further includes: a flow control valve having an input port for receiving said expanded oxidant supply gas from said compressor section of said heat engine and first and second output sections for delivering said first and second expanded oxidant gas portions, respectively; and a flow detector and control for detecting said first expanded oxidant gas portion and controlling said flow control valve to adjust said first and second expanded oxidant gas portions.

19. A hybrid fuel cell system in accordance with claim 18, wherein said controlling of said flow control valve in such that the first expanded oxidant supply gas portion promotes optimal temperature distribution and oxygen concentration in said fuel cell.

20. A hybrid fuel cell system in accordance with claim 1, wherein:

said fuel cell is a solid oxide fuel cell;

said heat recovery unit receives said second expanded oxidant supply gas portion; and said fuel cell system further comprises: an oxidizer for receiving exhaust gas from the cathode section of said fuel cell and for receiving exhaust gas from the anode section of said fuel cell to develop an output gas for said heat recovery unit.

21. A hybrid fuel cell system in accordance with claim 20, wherein said bypass assembly includes a bypass line for coupling said second expanded oxidant supply gas portion to a line responsive to exhaust gas from said cathode section of said fuel cell.

22. A hybrid fuel cell system in accordance with claim 21, wherein said heat engine operates at a higher gas flow than the maximum gas flow required by said fuel cell cathode.

23. A hybrid fuel cell system in accordance with claim 22, wherein:

said heat engine comprises a turbine generator having a compressor section for receiving said oxidant supply gas and performing said compressor cycle and an expansion section for receiving said heated compressed oxidant supply gas and performing said expansion cycle.

24. A hybrid fuel cell system in accordance with claim 21, wherein said bypass assembly further includes: a flow control valve having an input port for receiving said expanded oxidant supply gas from said expansion cycle of said heat engine and first and second output sections for delivering said fist and second expanded oxidant gas portions, respectively; and a flow detector and control for detecting said first expanded oxidant gas portion and controlling said flow control valve to adjust said first and second expanded oxidant gas portions.

25. A hybrid cell system in accordance with claim 22, wherein said controlling of said flow control valve in such that the first expanded oxidant supply gas portion promotes optimal temperature distribution and oxygen concentration in said fuel cell.

* * * * *